US007002513B2

(12) United States Patent
Brabec et al.

(10) Patent No.: US 7,002,513 B2
(45) Date of Patent: Feb. 21, 2006

(54) ESTIMATION AND RESOLUTION OF CARRIER WAVE AMBIGUITIES IN A POSITION NAVIGATION SYSTEM

(75) Inventors: Vernon Joseph Brabec, Livermore, CA (US); Clyde C. Goad, Columbus, OH (US); Alexander A. Khvalkov, Moscow (RU); Lev Borisovich Rapoport, Moscow (RU)

(73) Assignee: Topcon GPS, LLC, Paramus, NJ (US)

( * ) Notice: Subject to any disclaimer, the term of this patent is extended or adjusted under 35 U.S.C. 154(b) by 74 days.

(21) Appl. No.: 10/810,247

(22) Filed: Mar. 26, 2004

(65) Prior Publication Data

US 2005/0212697 A1   Sep. 29, 2005

(51) Int. Cl.
*G01S 5/02*     (2006.01)
*H04B 7/185*   (2006.01)

(52) U.S. Cl. .......................... 342/357.04; 342/357.03; 342/357.06

(58) Field of Classification Search ........... 342/357.03, 342/357.04, 357.06; 701/213, 215
See application file for complete search history.

(56) References Cited

U.S. PATENT DOCUMENTS

| 5,189,424 A | * | 2/1993 | Brown ..................... 342/25 R |
| 6,433,866 B1 | * | 8/2002 | Nichols ................... 356/141.1 |

* cited by examiner

*Primary Examiner*—Dao Phan
(74) *Attorney, Agent, or Firm*—Jeffrey M. Weinick

(57) ABSTRACT

A method and apparatus for resolving floating point and integer ambiguities in a satellite position navigation system is disclosed. A rover station is periodically positioned at unknown locations and has a satellite receiver capable of receiving the navigation signals. By calculating relative position coordinates between a base station in a known location and the rover station, and by calculating other position parameters relative to the satellite position, a geometric constraint based on a measured elevation angle between the rover and base station can be incorporated into data computations and processing to help resolve carrier phase ambiguities. The elevation angle is measured by transmitting multiple laser beams to an optical sensor on the rover station. This technique results in greater precision in determining the location of the rover.

22 Claims, 9 Drawing Sheets

FIG. 9A    FIG. 9B
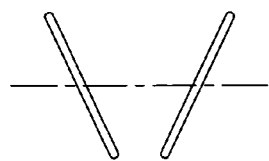 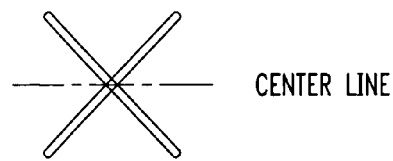 CENTER LINE
FIG. 9C    FIG. 9D    FIG. 9E
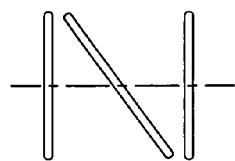 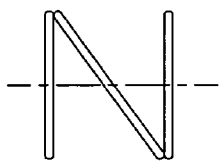 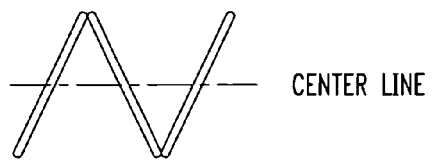 CENTER LINE
FIG. 9F    FIG. 9G    FIG. 9H
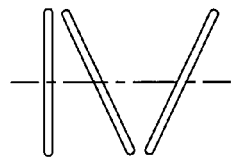 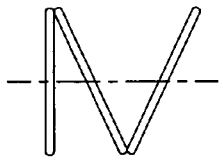 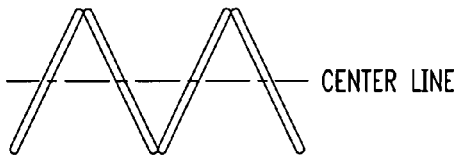 CENTER LINE
FIG. 9I    FIG. 9J
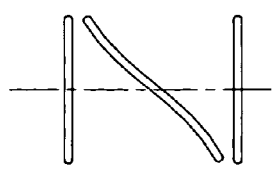 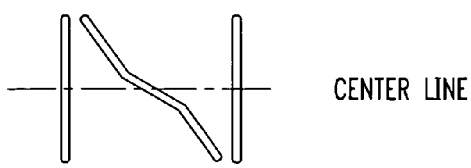 CENTER LINE

POSSIBLE POSITION OF THE ROVER

ESTIMATION AND RESOLUTION OF CARRIER WAVE AMBIGUITIES IN A POSITION NAVIGATION SYSTEM

BACKGROUND OF THE INVENTION

This invention relates generally to satellite navigation receivers and more particularly to estimating and resolving integer and floating point ambiguities of a navigation satellite carrier wave.

Satellite navigation systems, such as GPS (USA) and GLONASS (Russia), are well known in the art and are intended for highly accurate self-positioning of users possessing special navigation receivers. A navigation receiver receives and processes radio signals transmitted by satellites located within line-of-sight distance of the receivers. The satellite signals comprise carrier signals that are modulated by pseudo-random binary codes. The receiver measures the time delay of the received signal relative to a local reference clock or oscillator. These measurements enable the receiver to determine the so-called pseudo-ranges between the receiver and the satellites. The pseudo-ranges are different from the actual ranges (distances) between the receiver and the satellites due to various noise sources and variations in the time scales of the satellites and receiver. Each satellite has its own on-board atomic clock, and the receiver has its own on-board clock. If the number of satellites is large enough, then the measured pseudo-ranges can be processed to determine more accurately the user location and coordinate time scales.

The requirement of accurately determining user location with a high degree of precision, and the desire to improve the stability and reliability of measurements, have led to the development of differential navigation (DN). In differential navigation, the task of finding the user position, also called the Rover, is performed relative to a Base station (Base). The user may be mobile or immobile. The location coordinates of a moving Rover are continuously changing, and should be referenced to a time scale. The precise coordinates of the Base station are known and the Base station is generally stationary during measurements. The Base station has a navigation receiver which receives and processes the signals of the satellites to generate measurements. These signal measurements are transmitted to the Rover via a communication channel (e.g., wireless). The Rover uses these measurements received from the Base, along with its own measurements taken with its own navigation receiver, in order to precisely determine its location. The accuracy of a Rover location determination is improved in the differential navigation mode because the Rover is able to use the Base station measurements in order to compensate for the major part of the strongly correlated errors in the Rover measurements.

Various modes of operation are possible while using differential navigation (DN). In post-processing (PP) mode, the Rover's coordinates are determined by co-processing the Base and Rover measurements after all measurements have been completed. This allows for highly accurate location determination because more data is available for the location determination. In real-time processing (RTP) mode, the Rover's coordinates are determined in real time upon receipt of the Base station information received via the communication channel.

The location determination accuracy of differential navigation may be further improved by supplementing the pseudo-range measurements with measurements of the phases of the satellite carrier signals. If the carrier phase of the signal received from a satellite in the Base receiver is measured and compared to the carrier phase of the same satellite measured in the Rover receiver, measurement accuracy may be obtained to within several percent of the carrier's wavelength. The practical implementation of those advantages, which might otherwise be guaranteed by the measurement of the carrier phases, runs into the problem of ambiguity resolution for phase measurements.

The ambiguities are caused by two factors. First, the difference of a first distance from a satellite to the Base in comparison with a second distance from a satellite to the Rover is usually much greater than the carrier's wavelength. Therefore, the difference in the phase delays of a carrier signal received by the Base and Rover receivers may substantially exceed one cycle. Second, it is not possible to measure the integer number of cycles from the incoming satellite signals; one can only measure the fractional part. Therefore, it is necessary to determine the integer number of cycles, which is called the "ambiguity". More precisely, we need to determine the set of all such integer parameters for all the satellites being tracked, one unique integer parameter respectively associated with each satellite. One has to determine this set of integer ambiguities along with other unknown values, which include the Rover's coordinates and the variations in the time scales.

At a high level, the task of generating highly-accurate navigation measurements is formulated as follows: it is necessary to determine the state vector of a system, with the vector containing $n_\Sigma$ unknown components. Those include three Rover coordinates (usually along Cartesian axes X, Y, Z) in a given coordinate system (sometimes time derivatives of coordinates are added too); the variations of the time scales which is caused by the phase drift of the local main reference oscillator in the receiver; and n integer unknown values associated with the ambiguities of the phase measurements of the carrier frequencies. The value of n is determined by the number of different carrier signals being processed, and accordingly coincides with the number of satellite channels actively functioning in the receiver. At least one satellite channel is used for each satellite whose broadcast signals are being received and processed by the receiver. Some satellites broadcast more than one code-modulated carrier signal, such as a GPS satellite which broadcasts a carrier in the L1 frequency band and a carrier in the L2 frequency band. If the receiver processes the carrier signals in both of the L1 and L2 bands, a so-called dual-frequency receiver, the number of satellite channels (n) increases correspondingly. Dual-frequency receivers allow for ionosphere delay correction therefore making ambiguity resolution easier.

Two sets of navigation parameters are measured by the Base and Rover receivers, respectively, and are used to determine the unknown state vector. Each set of parameters includes the pseudo-range of each satellite to the receiver, and the full (complete) phase of each satellite carrier signal. Each pseudo-range is obtained by measuring the time delay of a code modulation signal of the corresponding satellite. The code modulation signal is tracked by a delay-lock loop (DLL) circuit in each satellite tracking channel. The full phase of a satellite's carrier signal is tracked by a phase-lock-loop (PLL) in the corresponding satellite tracking channel. An observation vector is generated as the collection of the measured navigation parameters for specific (definite) moments of time.

The relationship between the state vector and the observation vector is defined by a well-known system of navigation equations. Given an observation vector, the system of equations may be solved to find the state vector if the number of equations equals or exceeds the number of unknowns in the state vector. Conventional statistical methods are used to solve the system of equations: the least squares method, the method of dynamic Kalman filtering, and various modifications of these methods.

Practical implementations of these methods in digital form may vary widely. In implementing or developing such a method on a processor, one usually must find a compromise between the accuracy of the results and speed of obtaining results for a given amount of processor capability, while not exceeding a certain amount of loading on the processor.

One general scheme comprises the following steps. The measured values of the pseudo-ranges and full phases at specific (definite) moments of time, along with an indication of the satellites to which these measurements belong and the time moments of the measurements, are transmitted from the Base to the Rover. Corresponding values are measured in the Rover receiver. The processing includes the determination of the single differences of the pseudo-ranges and full phases between the Base and Rover measurements for each satellite. The strongly correlated errors are compensated (i.e., substantially cancelled) in the single differences. Then, the residuals of the single differences are calculated by subtraction of calculated values from the measured results. The processing of residuals allows one to linearize the initial system of navigation equations (sometimes several subsequent iterations are necessary), which makes possible the use of the well developed body of mathematics for solving systems of linear equations. The components of the state vector, with the n ambiguities included, are found as a result of the solution.

But the calculated values of the ambiguities are not necessarily integer numbers, and are often floating point numbers. Because of this, they are called float ambiguities, or floating ambiguities, at this stage of the solution. To find true values of the integer ambiguities one uses the procedure of rounding off the float ambiguity vector to the nearest set of integers. This process is called the ambiguity resolution. Only after the ambiguity resolution has been done is it possible to determine the true values of residuals and then, by solving the system of equations again, to find the coordinate values for the baseline connecting the Base and Rover, and consequently to determine the exact coordinates of the Rover and the correction to its clock drift.

The above described general scheme of computations is well known in the art and is described in further detail, for example, in, Bradford W. Parkinson and James J. Spilker Jr., Global Positioning Theory and Applications, Volume 163 of Progress In Astronautics and Aeronautics, published by the American Institute of Aeronautics and Astronautics, Inc, Washington D.C., 1996.

However, the task of measuring carrier phase is difficult to accomplish. In practice, we must use non-ideal receivers to measure the phases, with each receiver having a different clock offset with respect to the GPS time, and with each receiver having phase errors occurring during the measurement process. In addition, at the present time it is not practical to individually count the carrier cycles as they are received by the receiver's antenna since the frequency of the carrier signal is over 1 GHz. This creates the "integer cycle ambiguity" problem that necessitates the solution provided by the present invention. Resolving the cycle ambiguities efficiently and with reasonable precision is an important aspect in successfully using the phase information to improve the estimated coordinates of the baseline.

BRIEF SUMMARY OF THE INVENTION

The present invention provides an improved method and apparatus for achieving better accuracy in determining actual precise position coordinates of a stationary or moving object using navigation satellite signals, receiver time offsets, laser beam transmitter, and laser beam receiver.

One aspect of the invention is particularly oriented to speeding up the carrier phase ambiguity resolution of satellite-to-receiver signals by augmentation based on laser beam angle measurements.

The invention generally provides a technique for resolving carrier wave ambiguities in a satellite position navigation system. In one embodiment, a differential navigation system includes a base station positioned at a known location with a satellite receiver capable of receiving navigation signals in the form of carrier waves from one or more satellites. A rover station is periodically positioned at unknown locations and has a satellite receiver capable of receiving the same or similar navigation signals. By determining relative position coordinates between the base and rover as well as an elevation angle between the rover and base stations, and by calculating other position parameters relative to the satellite position, a geometric constraint can be developed to help resolve carrier wave phase ambiguities and minimize errors in determining the location of the rover.

In one embodiment a laser transmitter on the base station transmits multiple laser beams to an optical sensor on the rover as a basis for measuring the elevation angle between the base and rover. A geometric constraint in the form of a conical surface based on the elevation angle is used along with other parameters and calculations for estimation and resolution of floating point and integer carrier phase ambiguity estimation and resolution.

These and other advantages of the invention will be apparent to those of ordinary skill in the art by reference to the following detailed description and accompany drawings.

BRIEF DESCRIPTION OF THE DRAWINGS

FIGS. 9A through 9J are illustrations of exemplary emission patterns of laser beams generated by a laser transmitter.

DETAILED DESCRIPTION

Figure 1:
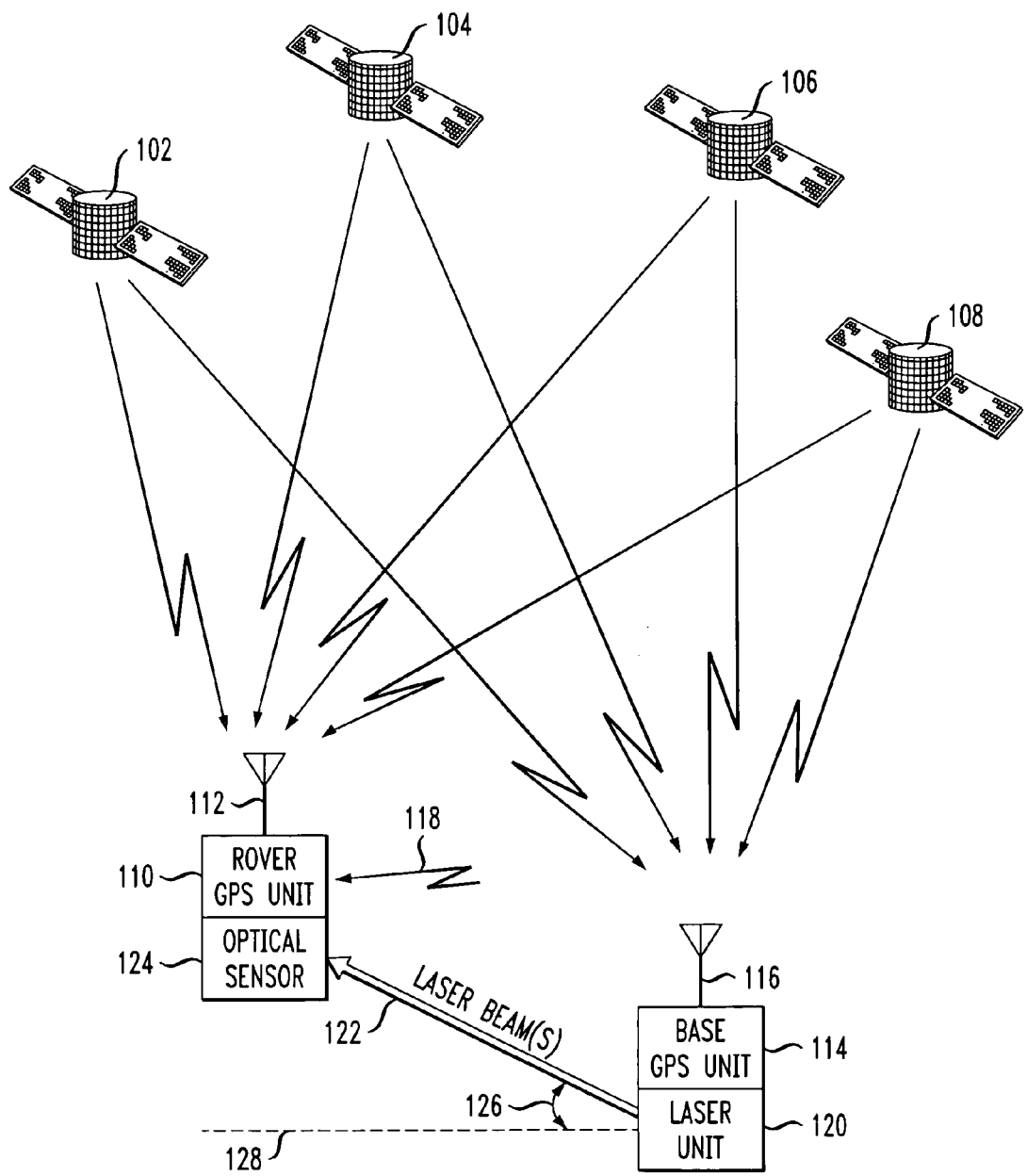
FIG. 1 is a schematic drawing incorporating selected features of the invention in a differential navigation system.

A typical exemplary position navigation system for implementing the features of the invention includes multiple satellites each radiating signals in two frequency bands: the L1 band and the L2 band. Two carrier signals are simultaneously transmitted in the L1-band; both carrier signals have the same frequency, but are shifted in phase by $\pi/2$ (90°). The first L1 carrier signal is modulated by the clear acquisition C/A-code signal and the second L1 carrier signal is modulated by the precision P-code signal. One carrier signal is transmitted in the L2 band, and uses a different frequency than the L1 carrier signals. The L2 carrier signal is modulated by the same P-code signal used to modulate the second L1 carrier signal. These carrier frequencies are between 1 GHz and 2 GHz in value. Each C/A-code signal and P-code signal comprises a repeating sequence of segments, or "chips", where each chip is of a predetermined time period and has a pre-selected value, which is either +1 or −1. The segment values follow a pseudo-random pattern, and thus the C/A-codes and the P-codes are called pseudo-random code signals, or PR-code signals. Additionally, before each C/A-code signal and P-code signal is modulated onto its respective carrier signal, each code signal is modulated by a low frequency (50 Hz) information signal (so-called information symbols).

The approximate distance between a satellite and a receiver is equal to the speed of light multiplied by the transmission time it takes the satellite signal to reach the receiver. This approximate distance is called the pseudo-range, and it can be corrected for certain errors to find a corrected distance between the satellite and the receiver. There is a pseudo-range between each visible satellite and the receiver. The transmission time from satellite to receiver is measured with the aid of clocks in the receiver and the satellite, and with the aid of several time scales (i.e., timing marks) present within the received satellite signal. The clocks in the satellites and the receiver are set to substantially the same time, but it is assumed that the receiver clock has a time offset because the receiver clock is based upon a quartz-crystal whereas each satellite clock is based upon a more accurate atomic reference clock. The receiver has the orbital patterns of the satellites stored in a memory, and it can determine the orbital position of the satellites based on the time of its clock. The receiver reads the timing marks on the satellite's signal, and compares them against it own clock to determine the transmission time from satellite to receiver.

The satellite's low-frequency (e.g., 50 Hz) information signal provides the least precise timing information, the C/A-code signal provides the next most precise timing information, and the P-code signal provides the most precise timing information. The pseudo-range is determined from the low-frequency information signal and the C/A-code signal for civilian users and some military users, and is determined from the low-frequency information signal and the P-code signal for most military users. Accurate use of the P-code signal requires knowledge of a certain code signal that is only known to military users. Better precision than that provided by the P-code signal can be obtained by measuring the phase of the satellite carrier signal in a differential navigation DN mode using two receivers.

FIG. 1 shows a schematic drawing of an exemplary differential navigation system incorporating certain features of the present invention. The differential navigation system includes a Rover GPS unit 110 and a Base GPS Unit 114. The location of the Base 114 is known and the system is attempting to determine the location of the Rover 110. As is well known in the art, Rover 110 receives signals from satellites 102, 104, 106, 108 via antenna 112. Similarly, Base 114 receives signals from satellites 102, 104, 106, 108 via antenna 1.16. The Base 114 transmits differential correction signals to the Rover 110 via communication channel 118. Communication channel 118 may be, for example, a wired or wireless connection. The techniques for determining the location of the Rover 110 in the illustrative system shown in FIG. 1 are well known in the art, for example as described in, Bradford W. Parkinson and James J. Spilker Jr., Global Positioning Theory and Applications, Volume 163 of Progress In Astronautics and Aeronautics, published by the American Institute of Aeronautics and Astronautics, Inc, Washington D.C., 1996.

A laser unit 120 associated with Base 114 transmits laser beam(s) 122 to an optical sensor 124 on the Rover 110 in order to precisely measure an elevation angle 126 between reference points on the Base and Rover. A local reference plane such as 128 is used for measuring the elevation angle. Additional details regarding the generation, transmission, detection and analysis of laser signals to measure the elevation angle are recited below in connection with FIGS. 5–9.

Figure 2:
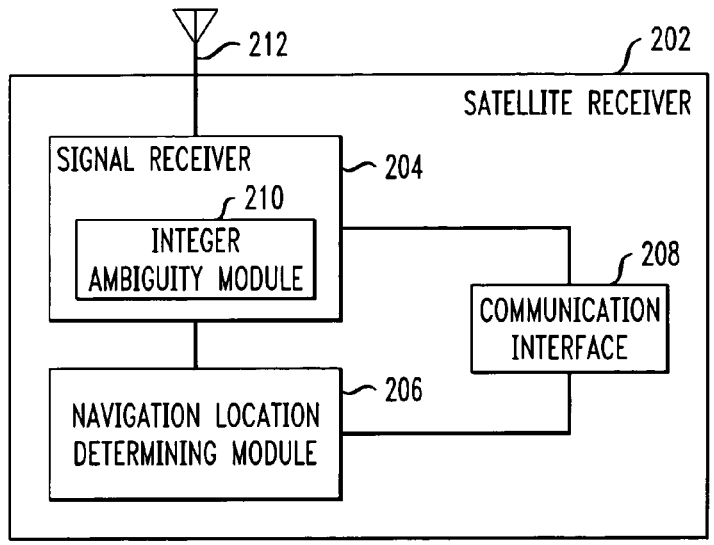
FIG. 2 is a high level block diagram of a satellite receiver configured in accordance with one embodiment of the invention.

In accordance with one embodiment of the present invention, the Rover unit 110 is modified to add the functionality of an integer ambiguity module in order to resolve integer ambiguities based at least in part on the measurement of elevation angle 126. A high level block diagram of a satellite receiver configured in accordance with one embodiment of the invention is shown in FIG. 2. FIG. 2 shows a satellite receiver unit 202 comprising a signal receiver 204 for receiving satellite signals via antenna 212. The signal receiver 204 provides signal measurements to the navigation location determining module 206. The navigation location determining module 206 performs the function of determining the location of the satellite receiver unit 202 using the measurements received from signal receiver 204. This function is sometimes referred to as the navigation task. The satellite receiver unit 202 also includes a communication interface 208 for communicating with other devices via a communication channel. For example, satellite receiver unit 202 receives information from the Base station via the communication interface 208. In accordance with an embodiment of the invention, the satellite receiver unit 202 also contains an integer ambiguity module 210 for operating in accordance with the principles of the present invention. It is to be understood that FIG. 2 is meant to show a high level functional block diagram of a satellite receiver unit for purposes of illustrating the principles of the present invention. There are, of course, other elements not shown which would be present in a satellite receiver unit. For example, a typical satellite receiver unit would include one or more processors for controlling the overall functioning of the unit. Such processors generally operate under the control of stored computer program code stored in a memory unit of the unit. Given the description herein, one skilled in the art would readily understand how to modify a well known satellite receiver unit in order to implement the principles of the present invention.

As used here the term receiver refers to both the GPS satellite receiver unit 202 and the signal receiver 204 which is part of the satellite receiver unit 202. One skilled in the art will recognize that these are different types of receivers. The satellite receiver unit 202 refers to the general unit used by a user to perform location functions by receiving and processing satellite signals, while the signal receiver 204 refers to a particular portion of the satellite receiver unit 202 which is a signal processing unit which receives signals via the antenna 212 and processes the signals (as described herein below) and sends certain signal measurements and parameters to the navigation location determining module for performance of the navigation task.

Figure 3:
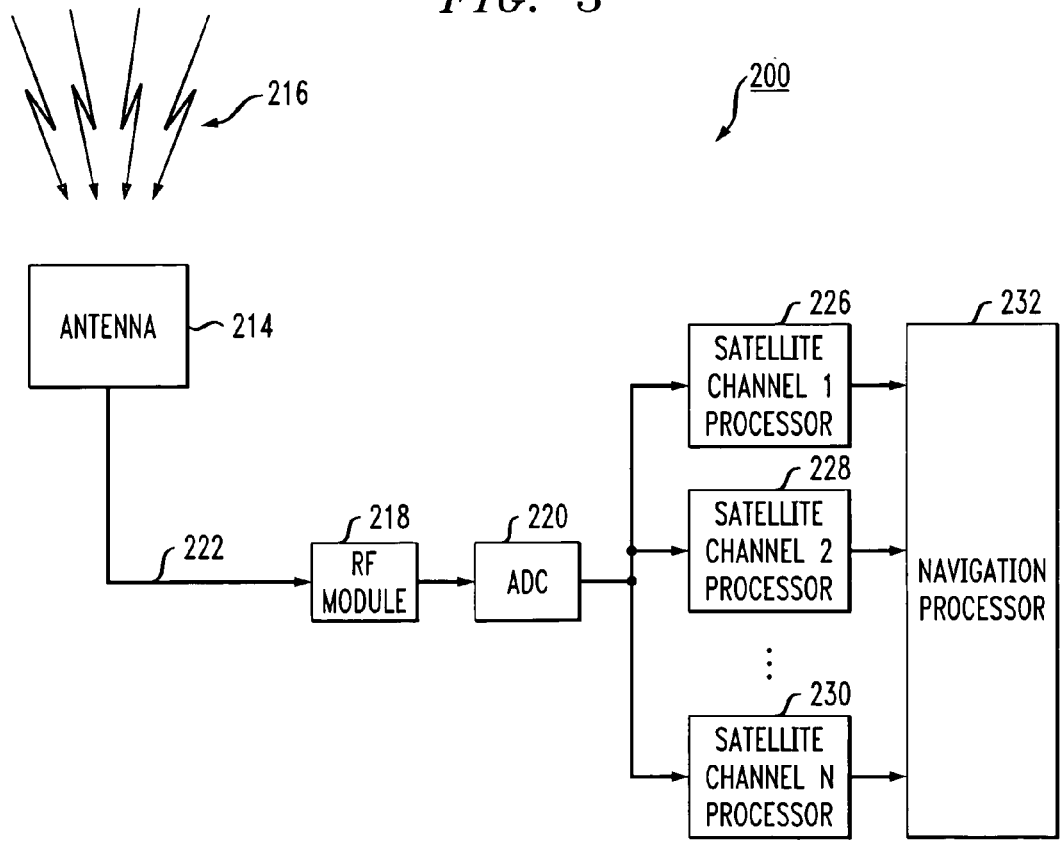
FIG. 3 is a high level block diagram showing processing of satellite signals used in embodiments of the invention.

FIG. 3 shows a high level block diagram of a satellite receiver 200 in accordance with one embodiment of the invention. It is noted that the block diagrams used herein are meant to describe the high level functioning and configuration of a unit. One skilled in the art would readily recognize that some of the blocks represent hardware components while other blocks represent some function or operation. The functions and operations may be performed by hardware circuits, software instructions executing on a processor, firmware, or some combination of hardware and software. Given the description herein, those skilled in the art would be able to implement the described functionality using well known and various combinations of hardware and software. As such, implementation details of the functions described herein will not be described in detail as such implementation details would be readily known to one skilled in the art.

Referring to FIG. 3, satellite receiver 200 comprises an antenna 214 for receiving satellite signals 216. RF cable 222 carries satellite signals from the antenna to RF module 218. RF module 218 amplifies, frequency converts, and filters the signal in a manner well known in the art. The signal output from the RF module 218 has low carrier frequency and sufficient power for analog to digital conversion. The output of the RF module 218 is provided to an analog-to-digital converter (ADC) 220, where the signal in each satellite channel is quantized by level and digitized by time. The ADC 220 provides the digital signal to individual satellite channel processors 226, 228, 230. The output of the satellite channel processors is provided to a navigation processor 232 which performs the navigation task.

Figure 4:
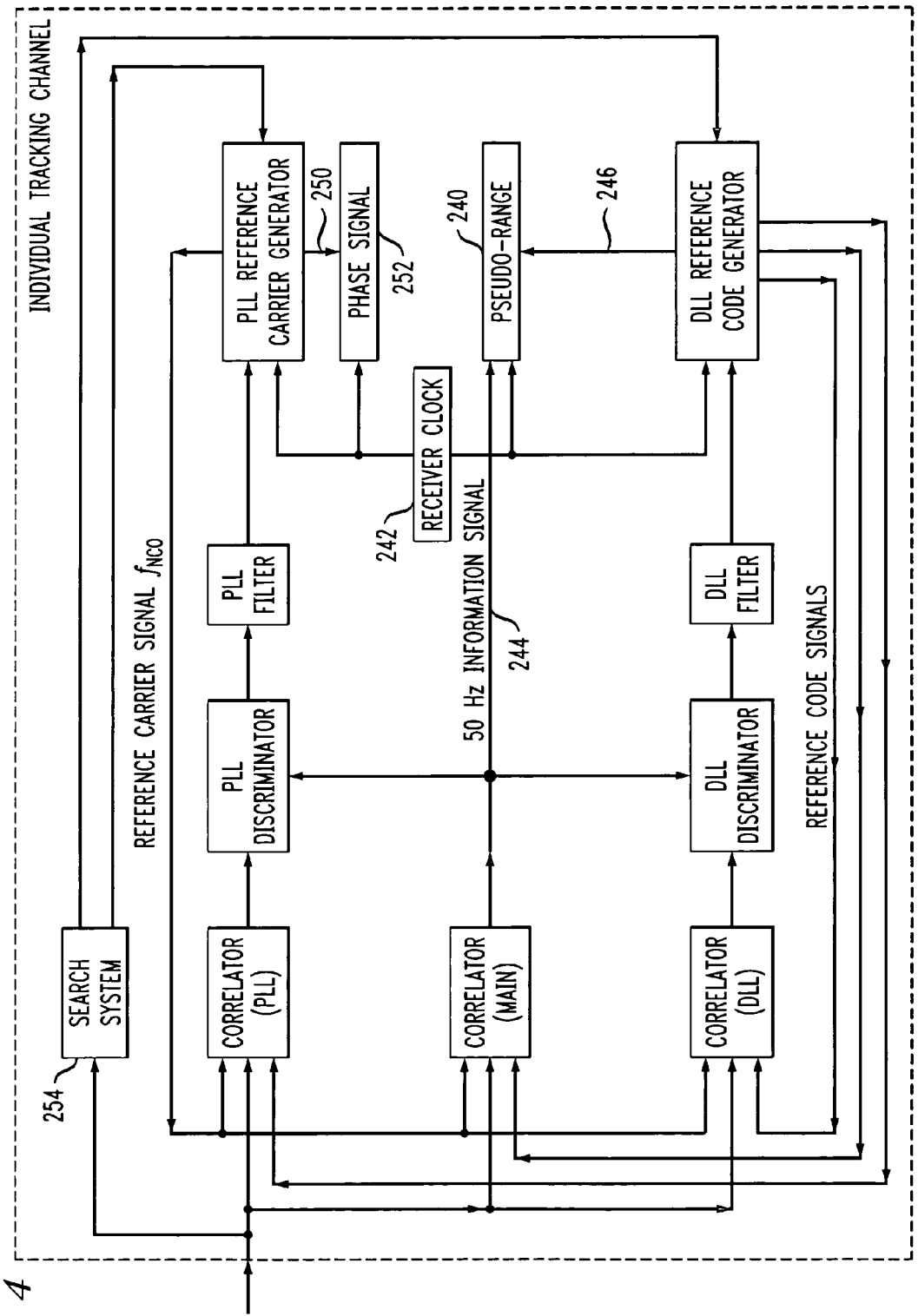
FIG. 4 is a functional block diagram for an individual tracking channel in a satellite receiver.

Referring to FIG. 4, each channel tracks a selected one of the satellite signals. Each tracking channel measures the delay of one PR-code signal within the satellite signal (e.g., C/A-code or P-code signal), and also the phase of the down-converter version of the satellite's carrier signal. A typical tracking channel comprises a Delay-Lock Loop (DLL) circuit for tracking the delay of the PR-code, a Phase-Lock Loop (PLL) circuit for tracking the phase of the satellite's carrier signal, and three correlators which generate the input signals for the DLL and PLL circuits.

The DLL circuit has a reference code generator that generates a set of reference code signals, each of which tracks the PR-code of the satellite signal, and each of which is provided as an input to a respective correlator. Each correlator output is representative of the degree to which the reference code signals are tracking the satellite code signal (i.e., the amount by which the reference signals are advanced or retarded in time with respect to the satellite signal). The DLL circuit also has a DLL discriminator and a DLL filter. The DLL discriminator receives inputs from two correlators, a DLL correlator that generates a base signal for controlling the DLL circuit and a main correlator that generates a signal useful for normalizing the base signal from the DLL corr-elator. The DLL discriminator generates an error control signal from these inputs; this error signal is filtered by the DLL filter before being provided to the DLL reference code generator as a control signal. The value of the DLL error signal varies by the amount that the reference code signals of the DLL generator are delayed or advanced with respect to the satellite code signal being tracked, and causes the code generator to adjust the timing of the reference code signals to better match the satellite's code signal. In this manner, tracking is achieved. The pseudo-range 240 may be generated by methods known to the art from the receiver clock 242, the 50 Hz information signal 244, and any one of the reference code signals 246 generated by the DLL.

In a similar manner, the PLL has a reference carrier generator that generates a reference carrier signal which tracks the down-converter version of the satellite's carrier signal. We denote the frequency of the reference carrier signal as fNCO since the reference carrier frequency is often generated by a numerically-controlled oscillator within the reference carrier generator. Referring to FIG. 4, the PLL circuit also has a PLL discriminator and a PLL filter. The PLL discriminator receives inputs from two correlators, a PLL correlator that generates a base signal for controlling the PLL circuit, and the main correlator that generates a signal useful for normalizing the base signal from the PLL correlator. Each correlator output is representative of the degree to which the reference carrier signal is tracking the satellite's carrier signal (i.e., the amount by which the reference carrier signal is advanced or retarded in time with respect to the satellite's carrier signal). The PLL discriminator generates an error control signal from these inputs; this error control signal is filtered by the PLL filter before being provided to the PLL reference carrier generator as a control signal. The value of the PLL error signal varies by the amount that the reference carrier signal of the PLL reference carrier generator is delayed or advanced with respect to the satellite carrier signal being tracked, and causes the reference carrier generator to adjust the timing of the reference carrier signal to better match the satellite's carrier signal. The reference carrier generator provides a phase input 250 representative of the phase (integrated frequency) of the PLL reference oscillator. This phase input signal 250 may be combined with other information to provide a final output signal 252 representative of the full phase of the satellite signal (but with ambiguities in it).

Finally, each individual tracking channel usually comprises a search system 254 which initially varies the reference signals to bring the PLL and DLL circuits into lock mode. The construction of this and the other above components is well known to the art, and a further detailed description thereof is not needed in order for one of ordinary skill in the art to practice the present invention.

The PLL loop can easily track the Doppler-shift frequency of the carrier signal, which is in the kHz range. As is known in the art, the satellite transmits at a fixed frequency, but the relative motion between the satellite and receiver causes the frequency seen by the receiver to be slightly shifted by the Doppler frequency. The reference oscillator (e.g., NCO) of the PLL circuit tracks the frequency of a selected one of the down-converted satellite signals. As a result, it inherently tracks the Doppler-shift frequency of the satellite's carrier signal.

In U.S. Pat. No. 6,268,824, which is commonly assigned with the present application and is incorporated herein by reference, it is shown how the observable phase signal is related to the distance between the receiver and the satellite.

The features of the invention can be implemented in many application environments and operational modes. The invention is suitable for both the real-time processing mode (RTP) and for the post-processing mode (PP). It is useful in general application areas where the relative positions between Rover and Base stations can be varied in all directions (X, Y and Z axes). It is also applicable to more limited environments such as where a Base station is always in a fixed position, or where a Rover is mounted on a vehicle or on excavation equipment, etc.

Figure 5:
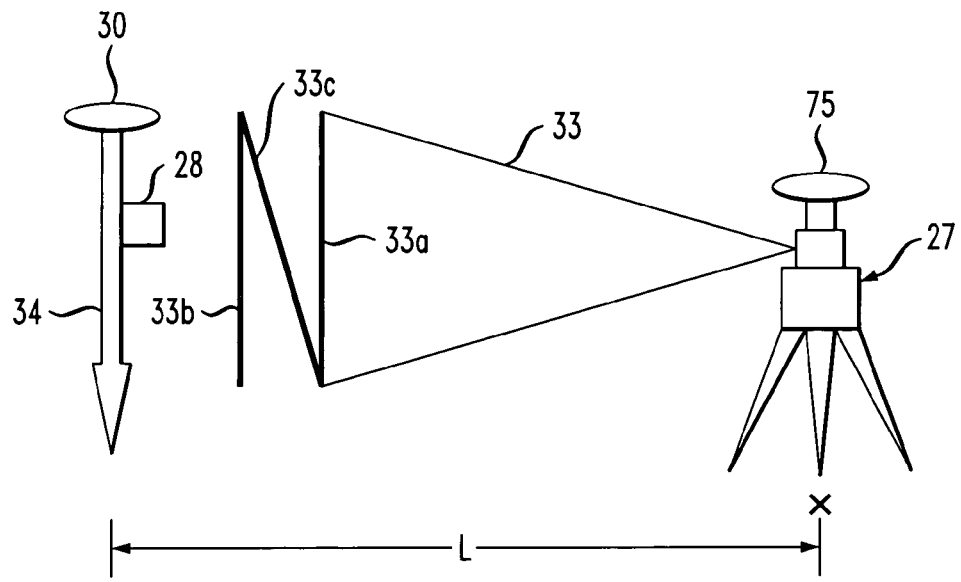
FIG. 5 is a schematic drawing showing a Base station laser transmitter for generating elevation measurements of a Rover station.
Figure 6:
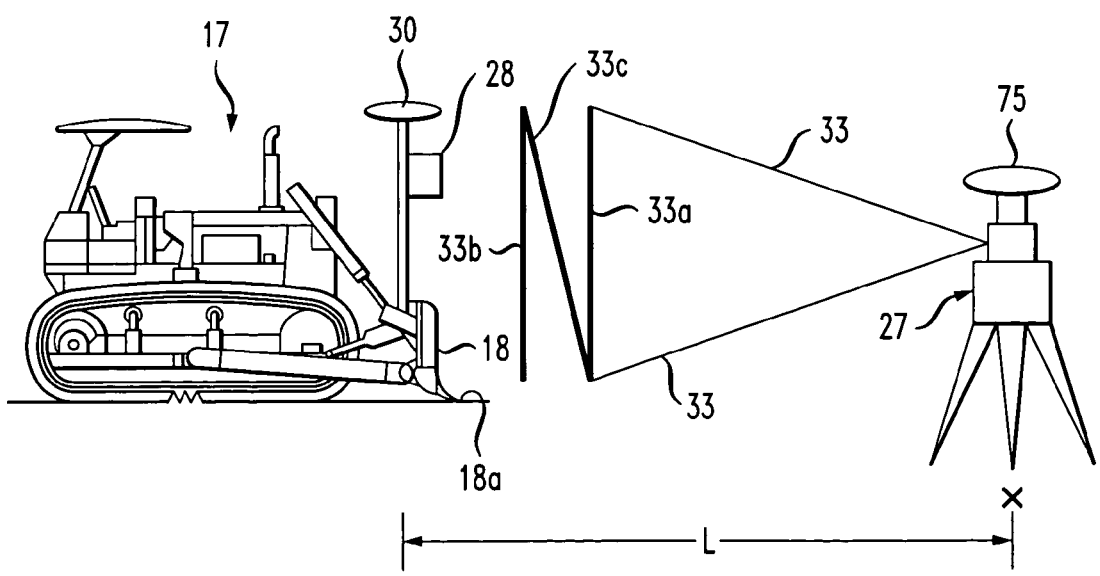
FIG. 6 is a schematic drawing showing a Base station laser transmitter for generating elevation measurements of a Rover station mounted on an excavation machine.

The laser unit 120 and optical sensor 124 of FIG. 1 are shown in exemplary embodiments of the invention in FIGS. 5 and 6. A rotary laser device 27 projects a plurality of beams by rotary irradiation to a photodetection sensor device 28. A tripod 29 installed for approximate alignment with a known point X supports the laser device 27. The tripod 29 carries a GPS measuring device 75 and constitutes a Base station. A Rover is shown as a mobile rod 34 that carries the sensor device 28. A GPS measuring device 30 is mounted an upper end of the rod 34 and provides positional information based on signals received from a satellite. The laser beam preferably incorporates fan-shaped beams 33a and 33b in a vertical direction and a fan-shaped beam 33c tilted diagonally with respect to the other two beams 33a, 33b forming an N-shaped configuration. It is not required that the fan-shaped beams 33a and 33b run in vertical directions, although detection and analysis may be benefited where they run parallel to each other and perpendicularly cross a horizontal reference plane.

Referring to the embodiment of FIG. 6, the Rover is mounted on excavation equipment such as earth mover 17 with a blade 18 having a scraping edge 18a located at a predetermined height.

Figure 7:
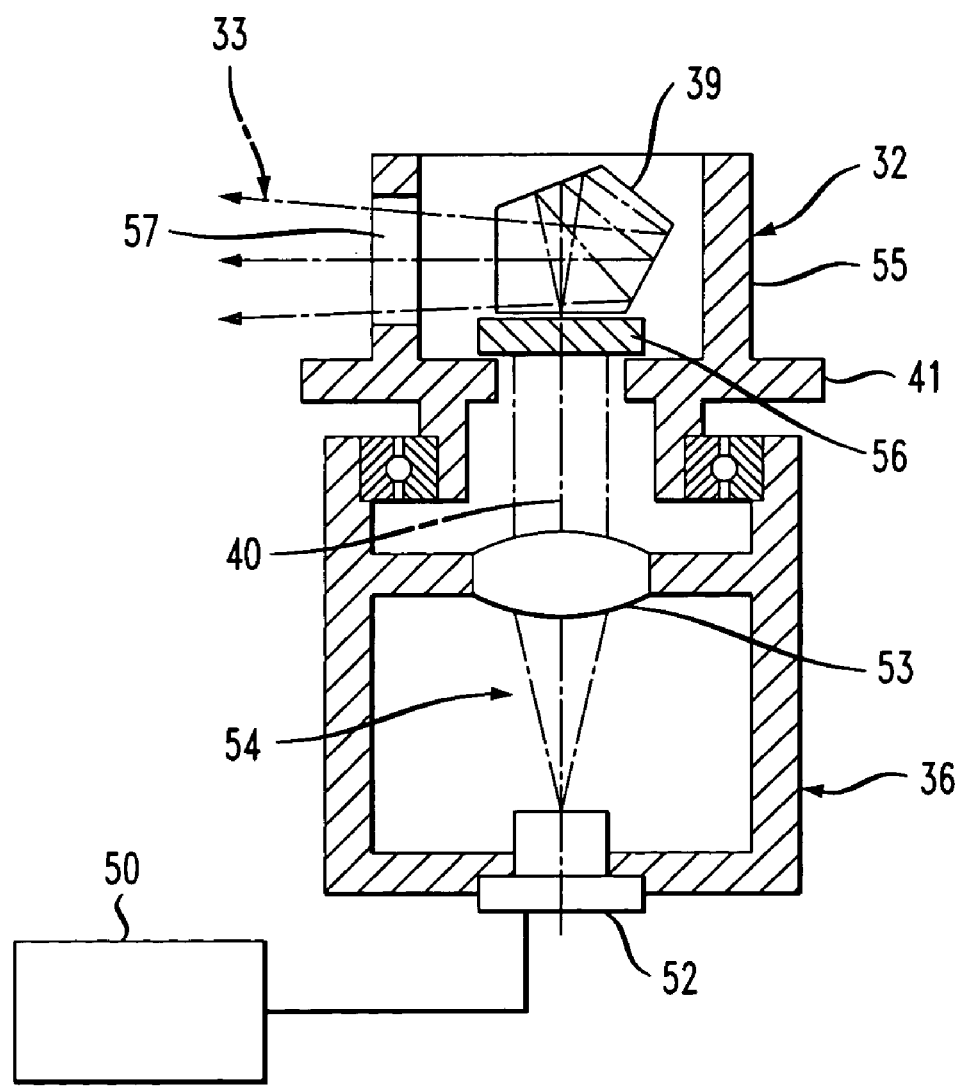
FIG. 7 is a cross-sectional view showing an exemplary laser transmitter as depicted in FIGS. 5–6.

Referring to FIG. 7, the rotary laser device 27 includes a laser projector 36 having a projection optical axis 40. The laser projection 36 is accommodated in the casing 35 for tilting at any angle. A rotator 32 is rotatably mounted on an upper portion of the laser projector 36, and a pentagonal prism 39 is mounted on the rotator 32. A motor drives the rotator through a scanning gear 41. A laser beam emitting unit 52 and a collimator lens 53 are arranged on a projection optical axis 40 together forming a projecting optical system 54. The rotator 32 includes a prism holder 55 supporting the prism 39 and a diffraction grating 56. The laser beam 33 emitted from the laser beam emitting unit 52 is turned to a parallel luminous flux by the collimator lens 53 and enters the diffraction grating 56. The incident laser beam 33 is divided by the diffraction grating 56 so as to form a plurality of fan-shaped laser beams such as 33a, 33b, 33c that are deflected in a horizontal direction by the pentagonal prism 39 and are projected through a projection window 57 of the prism holder 55. The characteristics of the laser beam are controlled by a control unit 50.

It will be understood by those skilled in the art that other forms of multiple laser beams generate from a laser transmitter may be utilized in practicing the invention such as beams respectively having different characteristics such as different frequencies, different polarizations, different wavelengths, different geometric forms, and/or different intensities.

Figure 8:
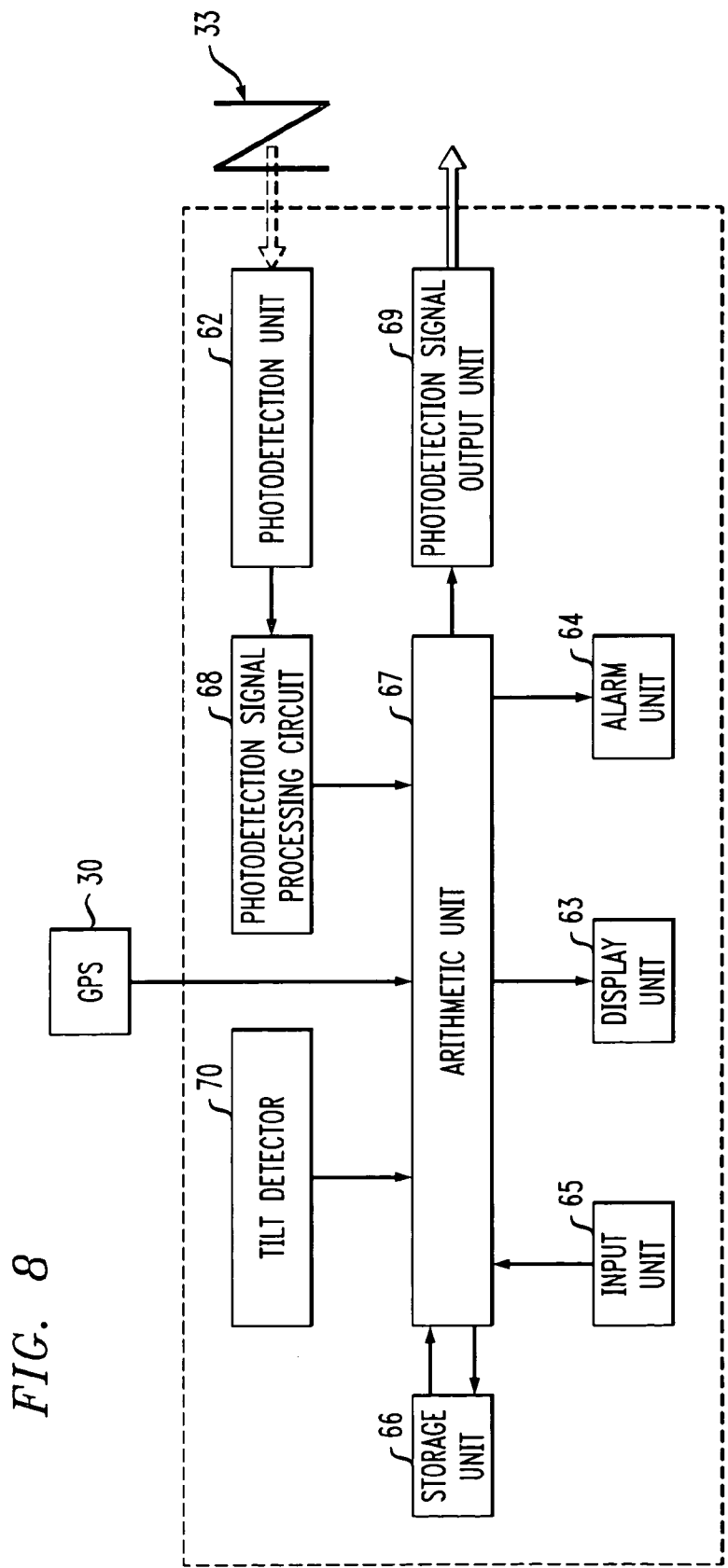
FIG. 8 is a schematic block diagram of a laser beam processing unit on a Rover station.

Referring to FIG. 8, a photodetection unit 62 for detecting the fan-shaped beams 33a, 33b, 33c is mounted on the photodetection sensor device 28. The photodetection sensor device 28 includes display unit 63, alarm unit 64, and input unit 65, as well as storage unit 66, arithmetic unit 67, photodetection signal processing circuit 68, photodetection signal output unit 59 and tilt detector 70 for detecting the tilting of rod 34.

By obtaining a time interval ratio for a laser beam passing across the sensor device 28, it is possible to calculate a passing position for each laser beam configuration. Accordingly an elevation angle for the Rover compared to the center line of the laser transmitter can be promptly calculated. Additional details for the exemplary laser transmission, detection, and analysis system is found in commonly assigned U.S. application Ser. No. 10/732,145 filed on Dec. 10, 2003 entitled WORKING POSITION MEASURING SYSTEM, and published as U.S. Patent Application Publication No. U.S. 2004/0125365 on Jul. 1, 2004, which is incorporated herein by reference.

Referring to FIGS. 9A through 9J, it will be understood by those skilled in the art that various beam patterns and variations analogous to an N-shaped laser signal can be used as a basis for sensing multiple diverging laser beams and computing an elevation angle between a reference point on a Base station and a corresponding reference point on a Rover. Some of these patterns incorporate only two fan-shaped beams (see FIGS. 9A–9B) while others incorporate three or more fan-shaped beams (see FIGS. 9C–9J). Also, patterns incorporating curved or creased fan-shaped beams (see FIGS. 9I–9J) can also be used. Exemplary techniques for detecting and computing elevation angles including the technique of using two separated light receiving sections in an optical sensor 28 for analyzing two selected fan-shaped beams are disclosed in commonly assigned co-pending U.S. application Ser. No. 10/338,705 filed on Jan. 9, 2003 entitled POSITION DETERMINING APPARATUS AND ROTARY LASER APPARATUS USED WITH THE SAME, and published as U.S. Patent Application Publication No. U.S. 2003/0136901 on Jul. 24, 2003, which is incorporated herein by reference.

Figure 10:
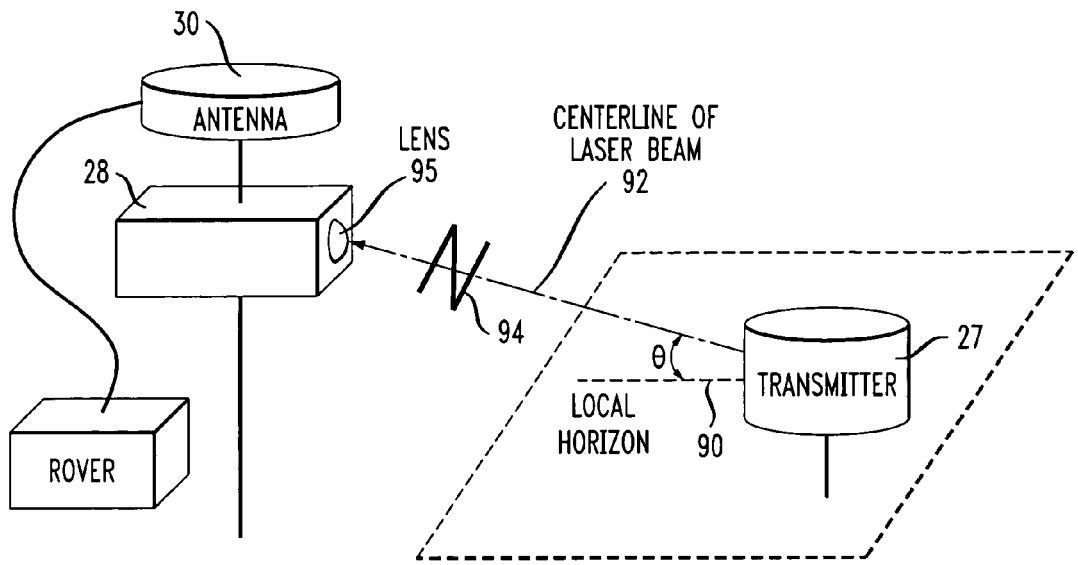
FIG. 10 is a schematic diagram showing an elevation angle as measured between a Base station laser transmitter and a reference point on a Rover station.

As shown schematically in FIG. 10, the invention provides Rover elevation angle theta measurements that are synchronized with GPS and GLONASS navigational data. The elevation angle is measured between a local horizon plane 90 and the central line 92 of the laser N-beam 94 emitted by the transmitter 27 and detected at the optical lens center of the sensor 28. The optical center of the sensor lens 95 is at a fixed distance with respect to the antenna phase center of the GPS Rover.

Accordingly for a known angle theta, the position of the antenna cannot be arbitrary. It must be found on a certain geometric surface. In other words, provided one knows the angle, only two degrees of freedoms are left instead of three to locate the antenna. Actually all three components of the Rover antenna (to be more precise–correction $\delta X$ to the rough position $X_0$ of the Rover antenna $X=X_0+\delta X$) are always used as a part of the vector $\hat{Y}_k$ in equation (7) below. Restriction from three degrees of freedom to only two degrees of freedom is performed implicitly, applying penalty term (5) to the cost function (6) below. In any case whether or not penalty is applied (whether or not the system (7) or (1) is solved) the state vector $\hat{Y}_k$ or $Y_k$ consists of x,y,z of correction $\delta X$, the time scales shift $\delta t$, and ambiguity.

Figure 11:
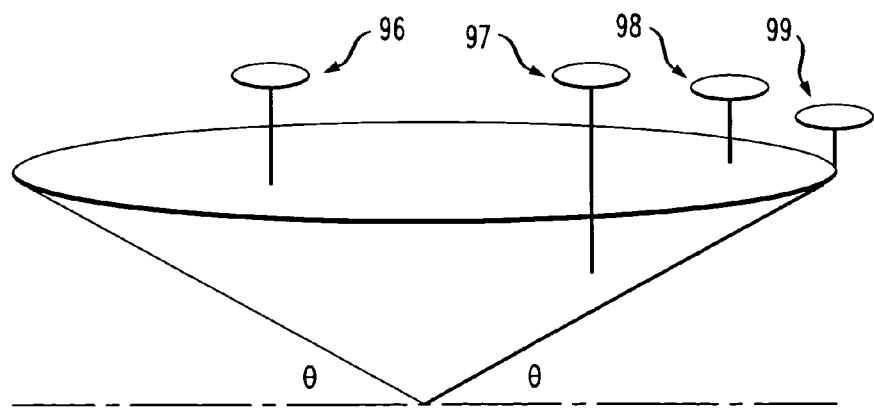
FIG. 11 is a schematic illustration showing estimated Rover positions constrained to belong to a conical surface generated from a measured elevation angle when estimating floating and integer ambiguity.

Referring to FIGS. 10–11, the geometric surface generated from the elevation angle theta is a cone with the vertex in the transmitter centerline point and a conical surface generated to be inclined to the local horizon by the angle theta measured by the sensor. If the Rover is at a higher elevation than the laser transmitter, the conical surface expands upwardly as shown in FIG. 11. Alternatively if the Rover is at a lower elevation than the laser transmitter, the conical surface expands downwardly. Possible antenna locations are indicated at 96, 97, 98, and 99 on the surface of the cone. Such locations can be anywhere on the conical surface however the computation of the two additional degrees of freedom such as two additional polar coordinates will ultimately confirm that only one of the possible reference points represents the correct integer ambiguity.

This geometric information is useful for the process of ambiguity fixing because it effectively restricts the region where the integer ambiguity may belong. Using this additional geometry constraint when estimating floating and resolving integer ambiguities makes it possible to better average GPS noise and finally to initialize faster and determine more rapidly and efficiently a baseline vector between the Base and Rover.

The ambiguity resolution task generally comprises the following three main parts:
1. Generation of the floating ambiguity estimations (estimating the floating ambiguities) when additional geometry constraint is applied;
2. Generation of the integer ambiguities based in part on the floating ambiguity; and
3. Formation of a signal of ambiguities resolution.

The present invention pertains to estimating and resolving both the integer ambiguities and the floating ambiguities. The apparatus and methods of our present invention use as an input data:
(a) the pseudo-ranges and full phase measurements obtained in the Base and Rover receivers;
(b) the satellites coordinates (which are highly predictable can be readily determined from the GPS time and information provided in the 50 Hz low-frequency information signal by methods well known to the art);
(c) the estimated coordinates of the Base and Rover stations (as measured at their antennas); which may be generated from the pseudo-range data by single point solutions, and oftentimes the coordinates of the base station are precisely known; and
(d) elevation angle parameters between the Base and Rover stations as measured using laser beams transmitted from the Base station to the Rover station.

The inputs (a)–(c) are used implicitly when calculating the right-hand side vector $R_k$ in equations (1) and (7) below.

The following recitation of data processing operations provides an explanation of the underlying computational operations in an exemplary implementation and embodiment of the invention. The mathematical analysis describes how the geometry constraint may be incorporated into the floating and fixed (i.e., integer) carrier phase ambiguity estimation schemes, provided the floating ambiguity estimation is performed recursively and either the normal system matrix or inverse of the covariance matrix of unknown parameters is available. The normal system matrix is denoted as $D_k$ below in the formula (1). The augmented matrix is denoted as $\hat{D}_k$ in (7). Augmentation results from application of the constraint (4).

Let:
vectors are supposed to be columns,
the symbol ' stands for the matrix transpose,
I be the identity matrix, $$-T = \begin{pmatrix} x_T \\ y_T \\ z_T \end{pmatrix}$$

be the known Laser Transmitter position, $$-X = \begin{pmatrix} x \\ y \\ z \end{pmatrix}$$

be the unknown position of the Rover, corrected for the antenna phase center to the Laser Sensor lens optical center offset,
h be the normal vector to the local horizon,
θ be the angle between the Laser Transmitter to the rover vector X–T and the local horizon measured by the Laser Elevation Angle detector,
$\|\cdot\|$ is the Euclidean vector norm,
lower index k stands for the number of number of epoch—current GPS time instant.

Let $X_0$ be a rough approximation to the Rover position and $\delta X$ be the correction so that $$X = X_0 + \delta X$$

Let also $$Y_k = \begin{pmatrix} \delta X_k \\ \delta t_k \\ N_k \end{pmatrix}$$

be the vector of parameters that are estimated at the k-th step of recursive estimation In the notation above, δt is the between receivers clock difference, N is the floating ambiguities vector. Whatever the numerical scheme of estimation of unknown parameters may be, in the very general form it looks like solution of the linear system with the symmetric positive definite matrix:

$$D_k Y_k = R_k \quad (1)$$

$$D_k = D_{k-1} + \Delta D_k \quad (2)$$

where $D_k$ is the normal system matrix or inverse of the covariance matrix, $R_k$ is the right hand side vector comprising navigation data measured in two receivers at the epoch k, floating ambiguities vector $N_{k-1}$ estimated at previous epochs, and accumulated information collected at previous epochs. The formula (2) presents the normal system update, which is the numerical core of the recursive estimation. Below we present a mathematical description of how the Elevation Angle geometry constraint, reflecting the fact that the corrected Rover position belongs to the surface of the cone, may be involved into the floating and fixed ambiguity estimation schemes.

Let us divide the matrix $D_k$ and the vector $R_k$ in the equation (1) into blocks in accordance with division of the vector of unknowns $Y_k$ into three parts:

$$D_k = \begin{pmatrix} D_{xx,k} & D_{xt,k} & D_{xn,k} \\ D_{tx,k} & D_{tt,k} & D_{tn,k} \\ D_{nx,k} & D_{nt,k} & D_{nn,k} \end{pmatrix}, R_k = \begin{pmatrix} R_{x,k} \\ R_{t,k} \\ R_{n,k} \end{pmatrix} \quad (3)$$

We will omit the epoch index $_k$ for the sake of brevity wherever this does not lead to misunderstanding. Given the vector h let $C_\|$ be the orthogonal projection onto the local horizon plane $C_{\|}=I-hh'$ and $C_{\perp}=hh'$ is the matrix of orthogonal projection onto the direction h which is the orthogonal complement to $C_{\|}$.

Provided there are no measurements errors, the identity $$\|C_{\|}(X-T)\|\tan(\theta)=\|C_{\perp}(X-T)\|$$

must hold.

Expanding last identity obtain that $$\phi(X)=((X-T)C_{\|}(X-T)^{1/2}\tan(\theta)-h'(X-T)=0. \quad (4)$$

Let also introduce the quadratic penalty cost function for violation of the equation (4):

$$\Phi(X)=\tfrac{1}{2}\phi(X)^2. \quad (5)$$

Note now that solution of the equation (1) is equivalent to minimization of the quadratic function $$F(Y)=\tfrac{1}{2}\|(D_k Y_k - R_k)\|^2 = \tfrac{1}{2}(D_k Y_k - R_k)'(D_k Y_k - R_k)$$

The equalities (1) and (4) will be treated by least squares minimizing the 'penalized' cost function $$P(Y)=F(Y)+w\cdot\Phi(X_0+\delta X), \quad (6)$$

where w is the weight with which the equality (4) must be taken into account along with (1). Then the augmented scheme of estimating floating ambiguities comprising using the Laser Elevation Angle data in the numerical process will consist in making one or more Newton iterations to minimize the nonlinear function P(Y) in (6). One Newton iteration takes the form $$\hat{D}_k \hat{Y}_k = \hat{R}_k, \quad (7)$$

where the augmented matrix $\hat{D}_k$ and vector $\hat{R}_k$ take the form:

$$\hat{D}_k = \begin{pmatrix} D_{xx,k} + w\dfrac{\partial^2}{\partial X^2}\Phi(X_0) & D_{xt,k} & D_{xn,k} \\ D_{tx,k} & D_{tt,k} & D_{tn,k} \\ D_{nx,k} & D_{nt,k} & D_{nn,k} \end{pmatrix} \quad (8)$$

$$\hat{R}_k = \begin{pmatrix} R_{x,k} - w\dfrac{\partial}{\partial X}\Phi(X_0) \\ R_{t,k} \\ R_{n,k} \end{pmatrix}.$$

Here $$\frac{\partial^2}{\partial X^2}\Phi(X) = \frac{\partial}{\partial X}\varphi(X)\frac{\partial}{\partial X}\varphi(X)' + \frac{\varphi(X)\tan(\theta)}{((X-T)'C_{\|}(X-T))^{\frac{1}{2}}}$$

$$\left( C_{\|} - \frac{1}{(X-T)'C_{\|}(X-T)} C_{\|}(X-T)(X-T)'C_{\|} \right)$$

$$\frac{\partial}{\partial X}\Phi(X) = \varphi(X)\left( \frac{\tan(\theta)}{((X-T)'C_{\|}(X-T))^{\frac{1}{2}}} C_{\|}(X-T) - h \right)$$

The numerical scheme above is formulated in the general form. It may be used independently of the specifics of the ambiguity estimation algorithm used in recursive estimation. The formulae (6), (7) express how to add one step of the Newton method to the ambiguity estimation scheme. The Newton method aims to minimize the penalty function (5) in the course of floating ambiguities estimation.

The floating point ambiguity estimation goes first before the integer ambiguity estimation. After floating ambiguity has been estimated using the geometric restraint of the cone surface, the augmented matrix $\hat{D}_k$ and current floating ambiguity estimation may be used the usual way when performing the integer ambiguity search.

Particularly, both Lenstra-Lenstra-Lovasz transformation and λ-decorrelation may be applied to the augmented matrix $\hat{D}_k$.

The observation vector consists of all navigation parameters comprising between satellites and Rover and between satellites and Base pseudo-ranges and carrier phases. The observation vector is involved into calculation of the right-hand side vector $R_k$ in the equation (1) above.

The state vector consists of all unknowns to be estimated: X,Y,Z of the Rover, clock shift, ambiguity for all satellites and frequency bands. More precisely: X,Y,Z of the Rover, between Rover and Base clock shift, between Base and Rover difference of ambiguity for all satellites and frequency bands. The state vector estimated at the epoch k is denoted by $Y_k$ in the equation (1) above.

The present invention does not replace or eliminate the "rounding of the float ambiguity vector to the nearest set of integers". Very generally speaking the term 'rounding off' depends on the norm one uses to measure the closeness of two vectors—floating and integer ambiguity in our case. The integer ambiguity resolution, or rounding off, may be considered as a solution to the problem:

$$\min_{N\in Z}\|N-\overline{N}\|$$

where $\overline{N}$ is the floating ambiguity vector, Z is the integer valued n-dimensional space (or integer lattice), N is the integer-valued vector of ambiguity to be found, $\|\cdot\|$ stands for the norm we use to measure the closeness between two vectors N and $\overline{N}$. Using the $\|\cdot\|_1$ norm (or sum of absolute values of the vector components) for $\|\cdot\|$ results in the 'rounding-off' in the usual sense as solution of the above minimization problem. We use another norm: weighted $\|\cdot\|_2$ or $\|\cdot\|_{D,2}$ which results in the minimization problem $$\min_{N\in Z}(N-\overline{N})'D(N-\overline{N}) \quad (MP).$$

The present invention (as part of integer ambiguity resolution) replaces the matrix D with the augmented matrix $\hat{D}$, where the matrix D appears in the equation (1), the matrix $\hat{D}$ is defined in the equation (8). Also the floating point vector $\overline{N}$ as part of the state vector $Y_k$ in (1) is replaced with the part of the state vector $\hat{Y}_k$ in (7).]

Figure 12:
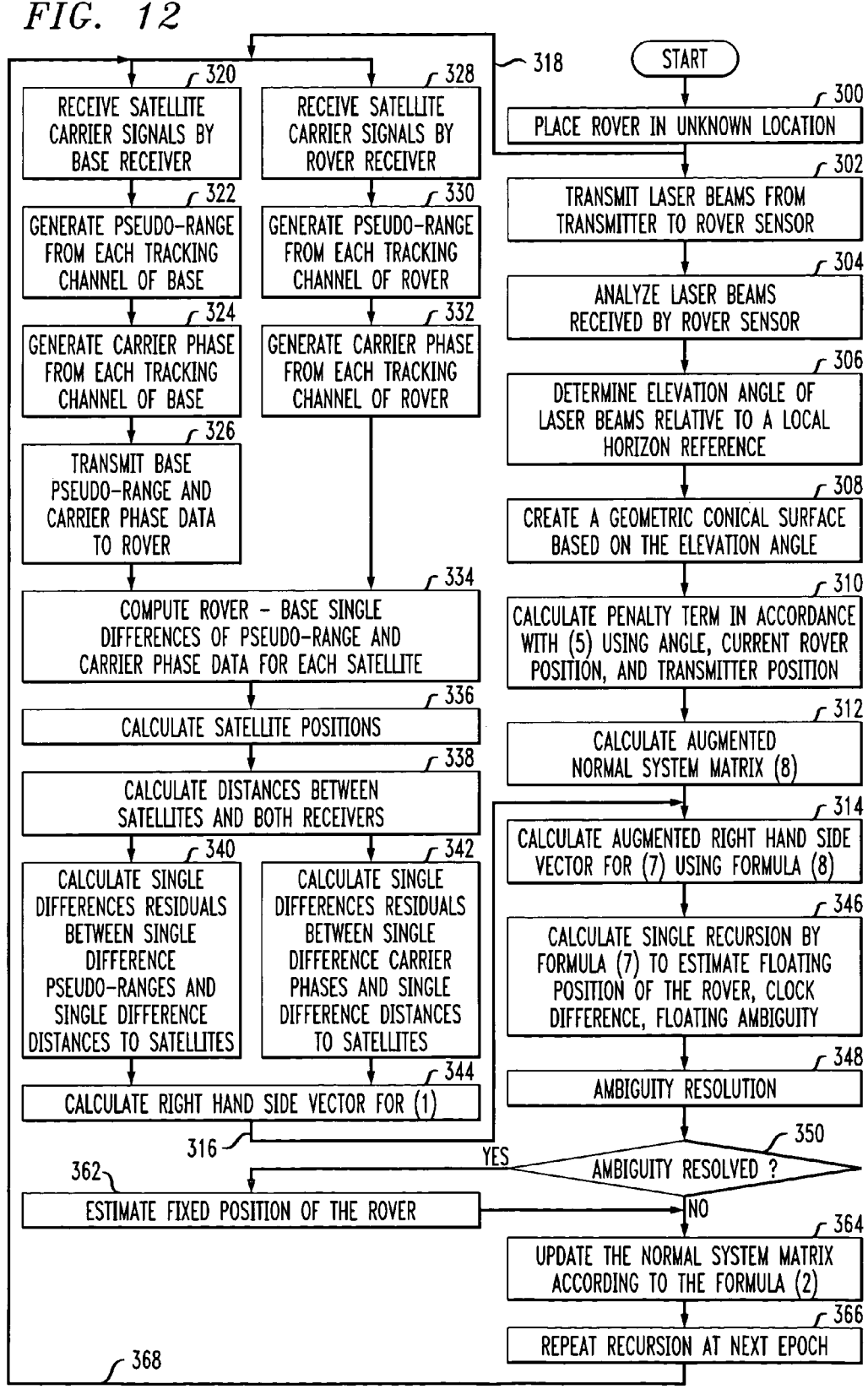
FIG. 12 is a flow chart for generating integer and floating point corrections based on an elevation angle and geometric surface as depicted in FIGS. 10–11.

Referring to the flow chart of FIG. 12, the various steps for implementing the method of operation for an exemplary embodiment in a differential navigation system are shown. Generally speaking each time a Rover is placed in a different unknown location, the invention provides a unique technique for collecting and processing various data parameters in order to generate spatial coordinates that identify the unknown Rover locations with as much precision as possible. The estimation and resolution of carrier wave ambiguities is an important part of this data collection, calculation and processing. After placing a Rover in an unknown location (step 300), laser beams transmitted from a known location such as a Base station are received by a rover sensor (step 302) and analyzed (step 304) in order to determine an elevation angle of the laser beams relative to a local horizon reference (step 306). This elevation angle is used to create a geometric conical surface (step 308) that provides a geometric constraint for estimating carrier phase ambiguities sent by the navigational satellites.

A penalty term is calculated in accordance with equation (5) using the elevation angle, current Rover position, and transmitter position (step 210). An augmented normal system matrix (8) is calculated (step 312) and then used along with input 316 to calculate an augmented right hand side vector for (7) (step 314).

The input 316 is generated by a series of steps incorporating data from both a Base station and the Rover that can proceed separately and independently from the laser beam detection and analysis. As shown by flowchart arrow 318, satellite carrier signals are received (step 320) and processed to generate pseudo-range (step 322) and carrier phase (step 324) parameters for further processing such as at the Rover (step 326). Analogous events occur for satellite carrier signals received by the Rover (steps 328, 330, 332). The combined data imputs from both Base and Rover is used to compute single differences of pseudo-range and carrier phase data for each satellite (step 334). Additional calculations are made for satellite positions (step 336) and for distances between satellites and both receivers (step 338). It is then possible to calculate single differences residuals involving pseudo-ranges (step 340) and carrier phases (step 342) which are both used for calculating right hand side vector (step 344) of equation (1).

After completing step 314 as described and shown, then step 346 calculates single recursion by formula (7) to estimate floating position of the rover, clock difference, and floating ambiguity. When ambiguity resolution (steps 348, 350) is deemed a success, then a final fixed position of the Rover is estimated (step 362). In some instances the ambiguity is not resolved. Nevertheless in both situations the normal system matrix is updated (step 364) according to the formula (2) and the sequence (step 368) starts all over again.

There are many iterations and reiterations of all the flowchart steps of FIG. 12 during initialization as well as thereafter as indicated at step 366 (Repeat recursion at next epoch).

The processing of residuals is presented in the very general form by formulae (1) and (2) where residuals are included into calculation of the right-hand side vector $R_k$. The cone surface is described by the identity (4). The additional geometry constraint—the Rover position must belong to the cone surface—is taken into account by applying the penalty function (5). So 'not belonging' to the cone surface (4) is 'penalized' by adding the penalty (5) with the weighing coefficient w to the cost function (6). This results in the replacement of the equation (1) with the equation (7) and further (8). The larger values takes the weighing coefficient w in (8), the more close to the cone surface the Rover position is forced to be. Also, as previously stated above, the augmented matrix $\hat{D}_k$ and floating ambiguity (as a part of the estimated vector $\hat{Y}_k$ in (7)) are involved into the integer search of ambiguity.

Improvement of both the integer ambiguity and the floating ambiguity estimations takes place step-by-step, and the probability of correct ambiguity resolution increases step-by-step as information is accumulated recursively as described by the equation (7). The geometry constraint (4) (which means 'to belong to the cone surface') is used periodically as a part of recursive process (7) and every time there is a necessity to resolve ambiguity or solve the problem (MP) above. Preferred finishing of this process is registered by appearance of the signal of integer ambiguities resolution, which indicates that ambiguity resolution was performed sufficiently safely. After that, the integer ambiguity estimations incorporating the features of the present invention together with other input data are used for accurate determination of the baseline vector between the Base and the Rover. The baseline vector is a three dimensional Rover—Base difference of X,Y,Z].

The above method of the present invention may be carried out in an integer ambiguity module 210 (see FIG. 2) or by data processor means located on a receiver or located remotely using hardware, software, firmware, or combinations thereof Program instructions implementing the invention may also be stored on disk, tape, non-volatile memory, volatile memory, or other forms of computer readable medium. In view of the detailed disclosure herein, it is well within the ability of one skilled in the GPS art to make, implement and use the present invention.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

What is claimed is:

1. Apparatus for resolving ambiguities in a satellite position navigation system comprising:
   a base station located at a known location comprising:
      a first satellite receiver capable of receiving navigation satellite signals including carrier signals;
      a laser transmitter;
   a mobile station comprising:
      a second satellite receiver capable of receiving navigation satellite signals including carrier signals;
      a photodetection device for receiving laser beams generated by said laser transmitter;
      an arithmetic processing unit for processing the laser beams in order to calculate an elevation angle between said laser transmitter on said base station and said mobile station; and
   a data processing unit in communication with said first and second satellite receivers for determining the location of said mobile station based at least in part on carrier signals, said data processing unit configured to resolve carrier phase floating point ambiguities based at least in part on said elevation angle.

2. The apparatus of claim 1 wherein said laser transmitter comprises a laser device for generating multiple beams having different geometric characteristics.

3. The apparatus of claim 2 wherein said multiple beams are shaped into two or more beams that diverge vertically.

4. The apparatus of claim 3 wherein said arithmetic processing unit for processing the laser beams computes a control signal from time delay between detections of the two or more beams by said photodetection device.

5. The apparatus of claim 1 wherein said data processing unit resolves carrier phase ambiguities as part of a repeated iterative procedure.

6. The apparatus of claim 1 wherein said arithmetic processing unit or said data processing unit calculates a geometric cone having a vertex at said laser transmitter wherein a reference point location for said mobile unit is estimated to be on the surface of said cone.

7. The apparatus of claim 1 wherein said data processing unit uses said floating point ambiguity at least in part for estimating an integer ambiguity.

8. A method for resolving carrier phase floating point ambiguities during position determination of a mobile unit in a satellite navigation system comprising the steps of:
receiving a laser beam generated by a laser transmitter at a known location;
calculating an elevation angle between said mobile unit and said laser transmitter; and
resolving floating point ambiguities in carrier waves received by the mobile unit based at least in part on geometric constraint generated from said elevation angle.

9. The method of claim 8 wherein said laser beam is N shaped.

10. The method of claim 8 wherein said laser beam comprises two or more fan-shaped beams that diverge vertically.

11. The method of claim 8 wherein said step of resolving comprises the steps of:
generating a geometric cone having a vertex at said laser transmitter wherein a reference point location for said mobile unit is estimated to be on the surface of said cone.

12. The method of claim 8 further comprising the steps of generating multiple laser beams from the laser transmitter, said beams respectively having different characteristics taken from the following: different frequencies, different polarizations, different wavelengths, different geometric forms, different intensities.

13. Apparatus for resolving ambiguities in a satellite position navigation system having a base station at a known location capable of receiving navigation satellite signals, and also having a laser transmitter, said apparatus comprising:
a mobile station;
a satellite receiver on said mobile station;
an optical sensor on said mobile station capable of receiving laser beams generated from the laser transmitter;
processor means for analyzing the laser beams to calculate an elevation angle between said mobile station and the base station, and for estimating phase integer ambiguities and floating point ambiguities based at least in part on said elevation angle.

14. The apparatus of claim 13 wherein said processor means estimates phase integer ambiguities as part of an initialization process.

15. The apparatus of claim 13 wherein said mobile station is associated with a construction machine.

16. The apparatus of claim 13 wherein said processor means calculates a geometric cone having a vertex at the laser transmitter wherein a reference point location for said mobile unit is estimated to be on the surface of said cone.

17. A method for resolving ambiguities during position determination of a mobile unit having an optical sensor to receive multiple laser beams and having an antenna to receive navigation satellite signals, comprising:
processing the satellite signals received by the antenna of the mobile unit in order to detect cycle and phase parameters;
analyzing the laser beams received by the optical sensor of the mobile unit in order to calculate an elevation angle between the mobile unit and a base station located at a known location;
resolving ambiguities in an estimated location of the mobile unit based on calculations incorporating the elevation angle; and
resolving floating point ambiguities based in part on said elevation angle.

18. The method of claim 17 which further comprises resolving ambiguities during an initialization process.

19. The method of claim 17 which further comprises calculating a geometric cone based on the elevation angle wherein a reference point location for said mobile unit is estimated to be on the surface of said cone.

20. A computer readable medium storing computer program instructions which are executable on a computer processor for resolving ambiguities during position determination of a mobile unit having an optical sensor to receive multiple laser beams and having an antenna to receive navigation satellite signals, said computer program instructions defining the following steps:
processing the satellite signals received by the antenna of the mobile unit in order to detect cycle and phase parameters;
analyzing the laser beams received by the optical sensor of the mobile unit in order to calculate an elevation angle between the mobile unit and a base station located at a known location; and
resolving both floating point and integer carrier ambiguities using geometric constraint based on calculations incorporating the elevation angle.

21. The computer readable medium of claim 20 which further includes program instructions for calculating a geometric cone based on the elevation angle wherein a reference point location for said mobile unit is estimated to be on the surface of said cone.

22. The computer readable medium of claim 20 which further includes program instructions for first estimating floating point ambiguities, and then using said estimated floating point ambiguities at least in part for estimating integer ambiguities.

* * * * *

UNITED STATES PATENT AND TRADEMARK OFFICE
CERTIFICATE OF CORRECTION

PATENT NO.         : 7,002,513 B2
APPLICATION NO.    : 10/810247
DATED              : February 21, 2006
INVENTOR(S)        : Vernon Joseph Brabec et al.

It is certified that error appears in the above-identified patent and that said Letters Patent is hereby corrected as shown below:

Column 6, line 13, "1.16", should read --116--.

Column 13, line 15, the equation (4) should read $$-\varphi(X) = \left((X-T)'C_1(X-T)\right)^{\frac{1}{2}} \tan(\theta) - h'(X-T) = 0 --.$$

Column 14, line 46, "N and N" should read -- $\bar{N}$ and $N$ --.

Signed and Sealed this

Fifteenth Day of August, 2006

JON W. DUDAS
*Director of the United States Patent and Trademark Office*